United States Patent
Wang

(10) Patent No.: US 7,464,905 B2
(45) Date of Patent: Dec. 16, 2008

(54) TUBULAR MATERIAL FIXATION DEVICE

(75) Inventor: Chia-Ming Wang, Shenkeng Township, Taipei County (TW)

(73) Assignee: Sallas Industrial Co., Ltd., Taipei County (TW)

( * ) Notice: Subject to any disclaimer, the term of this patent is extended or adjusted under 35 U.S.C. 154(b) by 0 days.

(21) Appl. No.: 11/785,262

(22) Filed: Apr. 17, 2007

(65) Prior Publication Data

US 2008/0054126 A1   Mar. 6, 2008

(30) Foreign Application Priority Data

Sep. 1, 2006   (TW) .............................. 95132409 A

(51) Int. Cl.
*F16L 3/08* (2006.01)

(52) U.S. Cl. .................... 248/65; 248/229.2; 248/230.7

(58) Field of Classification Search .................. 248/65, 248/67.7, 73, 74.1, 74.4, 75, 230.7, 231.81, 248/229.2, 229.1, 539; 403/234, 232, 237, 403/290, 373
See application file for complete search history.

(56) References Cited

U.S. PATENT DOCUMENTS 2,625,354 A * 1/1953 Smith ........................... 248/58
4,911,387 A * 3/1990 Daiglo et al. ................. 248/62

FOREIGN PATENT DOCUMENTS

WO   WO9835415 A1 * 8/1998

* cited by examiner

*Primary Examiner*—Ramon O Ramirez
(74) *Attorney, Agent, or Firm*—Rosenberg, Klein & Lee

(57) ABSTRACT

A tubular material fixation device includes a locating block, which has a clamping groove and two sidewalls disposed at two sides of the clamping groove and defining a respective guide surface portion, a clamping plate, which has a curved portion corresponding to the clamping groove, two side panels respectively extending from two sides of the curved portion, and two ribs respectively extending from the side panels corresponding to the guide surface portions of the locating block, and fastening units for fastening the side panels to the sidewalls to force the ribs along the guide surface portions and to further move the side panels of the clamping plate toward the locating block so as to lock a tubular material in between the clamping groove and the curved portion.

11 Claims, 6 Drawing Sheets

TUBULAR MATERIAL FIXATION DEVICE

BACKGROUND OF THE INVENTION

1. Field of the Invention

The present invention relates to fixation devices and more particularly, to a tubular material fixation device for fastening to a tubular material to provide excellent fixation effect when fastened up.

2. Description of the Related Art

In many apparatus, fixation devices are used to fix parts together, assuring positive positioning of the mechanism or excellent status of use during operation.

FIG. 4 illustrates a tubular material fixation device according to the prior art. According to this design, the tubular material fixation device is comprised of a locating block 41 and a C-shaped cap 43. The locating block 41 and the C-shaped cap 43 are respectively attached to the tubular material 47 at two sides, and then screws 45 are inserted through the through holes on the two distal ends of the C-shaped cap 43 and threaded into respective screw holes on the locating block 41.

However, for enabling the tubular material fixation device to provide a certain clamping force, the C-shaped cap 43 and the locating block 41 are so made that a gap is left between the C-shaped cap 43 and the locating block 41 when the C-shaped cap 43 and the locating block 41 are respectively attached to the tubular material 47 at two sides. Therefore, when fastening up the screws 45, the C-shaped cap 43 is forced to give a pressure to the tubular material 47 against the locating block 41.

During installation, it is difficult to have the screws 45 be threaded into the respective screw holes at the same depth to impart an equal pressure to the C-shaped cap 43. At this time, the gaps between the two ends of the C-shaped cap 43 and the locating block 41 are unequal, thereby lowering the wrapping power of the fixation device. Besides, the tension and both screws are in the same direction that will result the screws and screw holes being easily damaged, furthermore, the C-shaped cap 43 will be unable to hold down the tubular material 47.

Further, the C-shaped cap 43 wear quickly with use, thereby lowering its clamping function.

SUMMARY OF THE INVENTION

The present invention has been accomplished under the circumstances in view. It is one object of the present invention to provide a tubular material fixation device, which uses guide surface portions to guide ribs of side panels of a clamping plate, when fastening tight fastening units, enhancing the clamping force so as to hold down a tubular material in between a curved portion of the clamping plate and a clamping groove of a locating block.

It is another object of the present invention to provide a tubular material fixation device, which is safe in use and provides an excellent fixation effect.

It is still another object of the present invention to provide a tubular material fixation device, which provides a high wrapping power to the tubular material.

To achieve these and other objects of the present invention, the tubular material fixation device comprises a locating block, the locating block comprising a clamping groove and two sidewalls at two sides of the clamping groove, the sidewalls each having at least one guide surface portion; a clamping plate, the clamping plate having a curved portion corresponding to the clamping groove for securing a tubular material to the clamping groove, two side panels respectively extending from two sides of the curved portion for attaching to the sidewalls of the locating block, and two ribs respectively extending from the side panels corresponding to the guide surface portions of the locating block; and at least one fastening unit for fastening the side panels to the sidewalls to affix the locating block and the clamping plate to a tubular material being set in between the clamping groove and the curved portion.

DETAILED DESCRIPTION OF THE PREFERRED EMBODIMENT

Figure 1:
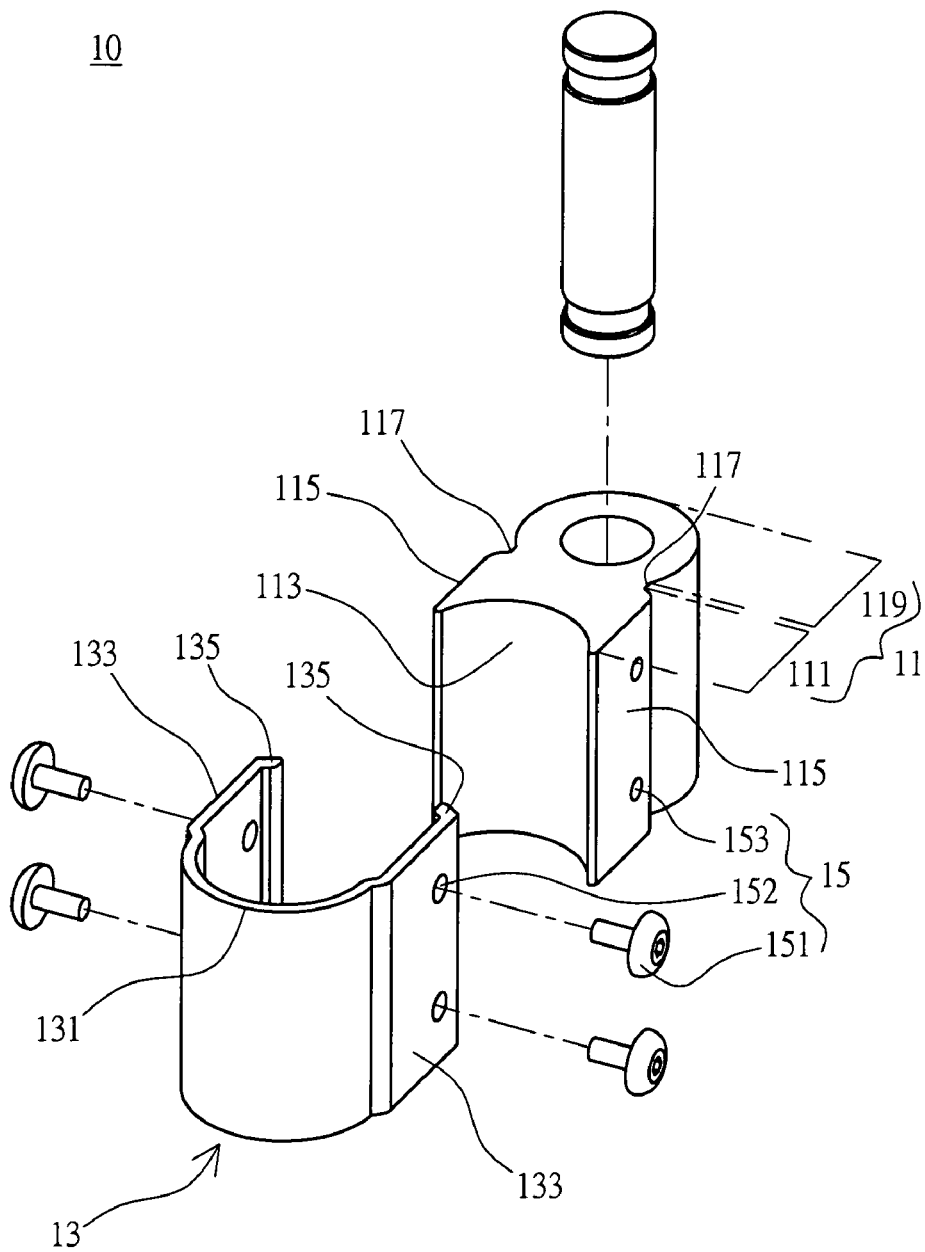
FIG. 1 is an exploded view of a tubular material fixation device in accordance with a first embodiment of the present invention.

Referring to FIG. 1, a tubular material fixation device 10 in accordance with a first embodiment of the present invention is shown comprised of a locating block 11, a clamping plate 13, and fastening units 15.

The locating block 11 comprises a clamping portion 111. The clamping portion 111 has a clamping groove 113, and two sidewalls 115 extending along two opposite sides of the clamping groove 113. Each sidewall 115 has at least one guide surface portion 117.

The clamping plate 13 has an curved portion 131 corresponding to the clamping groove 113, two side panels 133 respectively extending from two opposite lateral sides of the curved portion 131 corresponding to the sidewalls 115 of the locating block 11, and a plurality of ribs 135 corresponding to the guide surface portions 117 of the sidewalls 115.

The fastening units 15 are adapted to fasten the side panels 133 of the clamping plate 13 to the sidewalls 115 of the locating block 11, thereby firmly secure a tubular material (not shown) in between the locating block 11 and the clamping plate 13. When fastening the side panels 133 of the clamping plate 13 to the sidewalls 115 of the locating block 11 with the fastening units 15, the fastening pressure forces the ribs 135 to move upward along the associating guide surface portions 117 and to further carry the clamping plate 13 toward the clamping portion 111, thereby forcing the clamping groove 113 and the curved portion 131 to hold down the tubular material.

The guide surface portions 117 can be oblique planes or arched planes for guiding the associating ribs 135. According to this embodiment, the clamping groove 113 and the curved portion 131 commonly have a smoothly arched cross section for securing a tubular material having a circular cross section. Alternatively, the clamping groove 113 and the curved portion 131 can be made having a V-shaped cross section suitable for securing a tubular material having a rectangular rhombic cross section.

Further, each fastening unit 15 comprises a screw 151, a through hole 152, and a screw hole 153. The through hole 152 cuts through one side panel 133 of the clamping plate 13. The screw hole 153 is formed on one sidewall 115 of the clamping portion 111 of the locating block 11 corresponding to the through hole 152. The screw 151 is inserted through the through hole 152 and threaded into the screw hole 153 to affix the respective side panel 133 to the respective sidewall 115. The diameter of the through hole 152 is slightly greater than the diameter of the screw 151 to provide a space for allowing displacement of the respective side panel 133 relative to the respective sidewall 115 when the screw 151 is threading into the screw hole 153 to cause movement of the respective rib 135 along the respective guide surface portion 117.

The locating block 11 further comprises a bearing portion 119 joined to the clamping portion 111. After fixation of the tubular material fixation device 10 to a tubular material, a supported member, for example, a display screen (not shown) is installed in the bearing portion 119 and supported thereon.

Figure 2A:
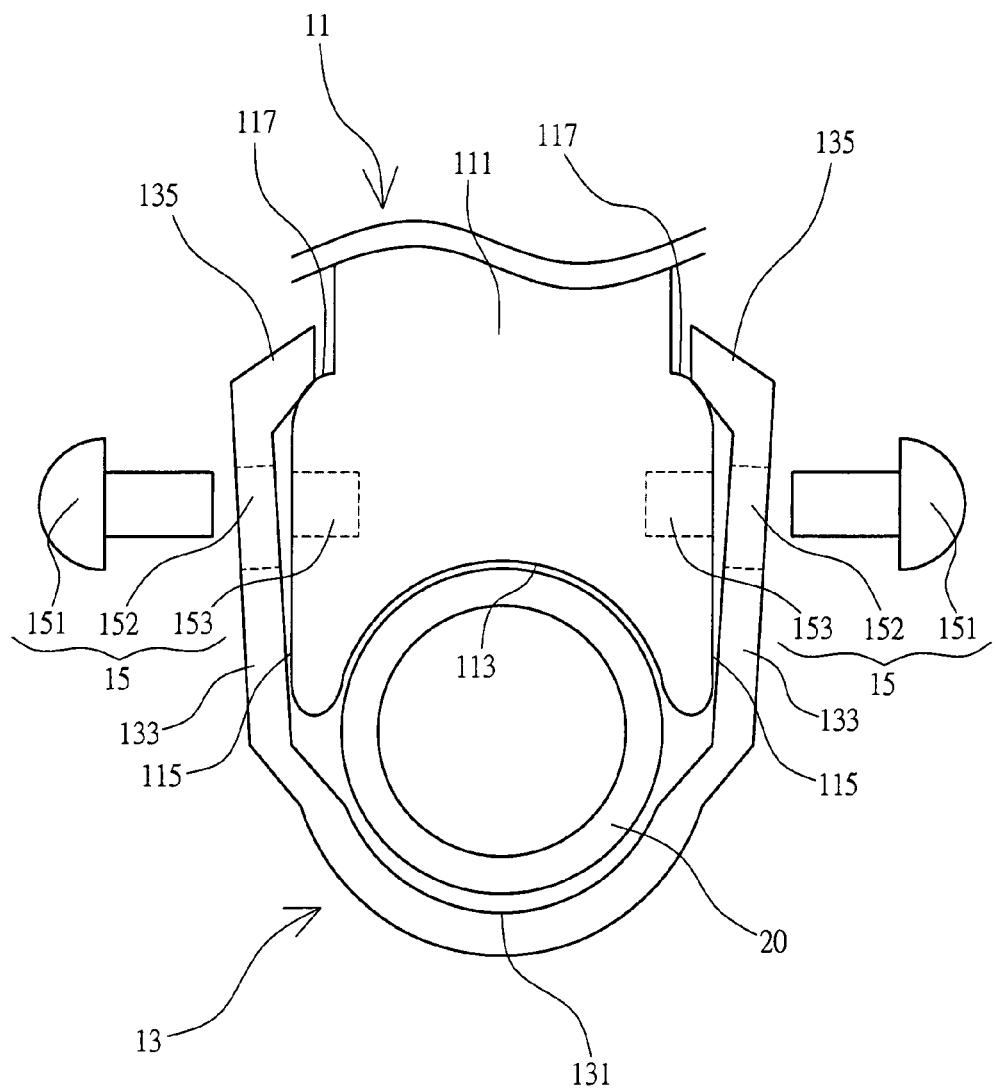
FIG. 2A is a schematic sectional view showing an application example of the tubular material fixation device according to the first embodiment of the present invention (I).
Figure 2B:
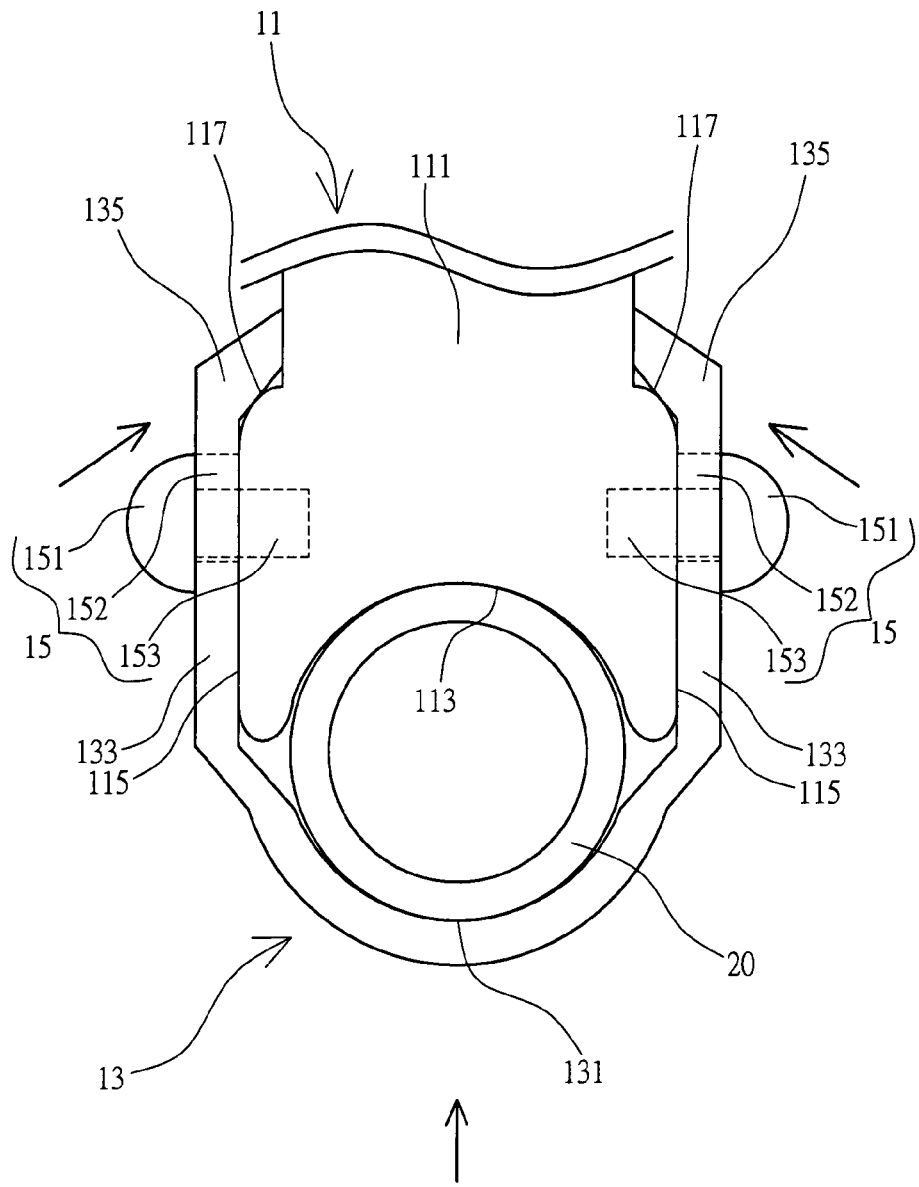
FIG. 2B is a schematic sectional view showing an application example of the tubular material fixation device according to the first embodiment of the present invention (II).

Referring to FIGS. 2A and 2B, by means of the locating block 11, the clamping plate 13 and the fastening units 15, the tubular material fixation device 10 is affixed to a tubular material 20. When fastening the tubular material fixation device 10 to the tubular material 20, the tubular material 20 is set in between the clamping groove 113 of the clamping portion 111 of the locating block 11 and the curved portion 131 of the clamping plate 13. At this time, the ribs 135 touch the associating guide surface portions 117 slightly, as shown in FIG. 2A.

When fastening up the fastening units 15 to affix the respective side panels 133 to the respective sidewalls 115, the ribs 135 are forced by the pressure from the screws 151 to move upwards along the associating guide surface portions 117 and to carry the clamping plate 13 toward the clamping portion 111, causing the clamping groove 113 and the curved portion 131 to produce a clamping force that clamps the tubular material 20 positively in position, as shown in FIG. 2B.

Figure 3A:
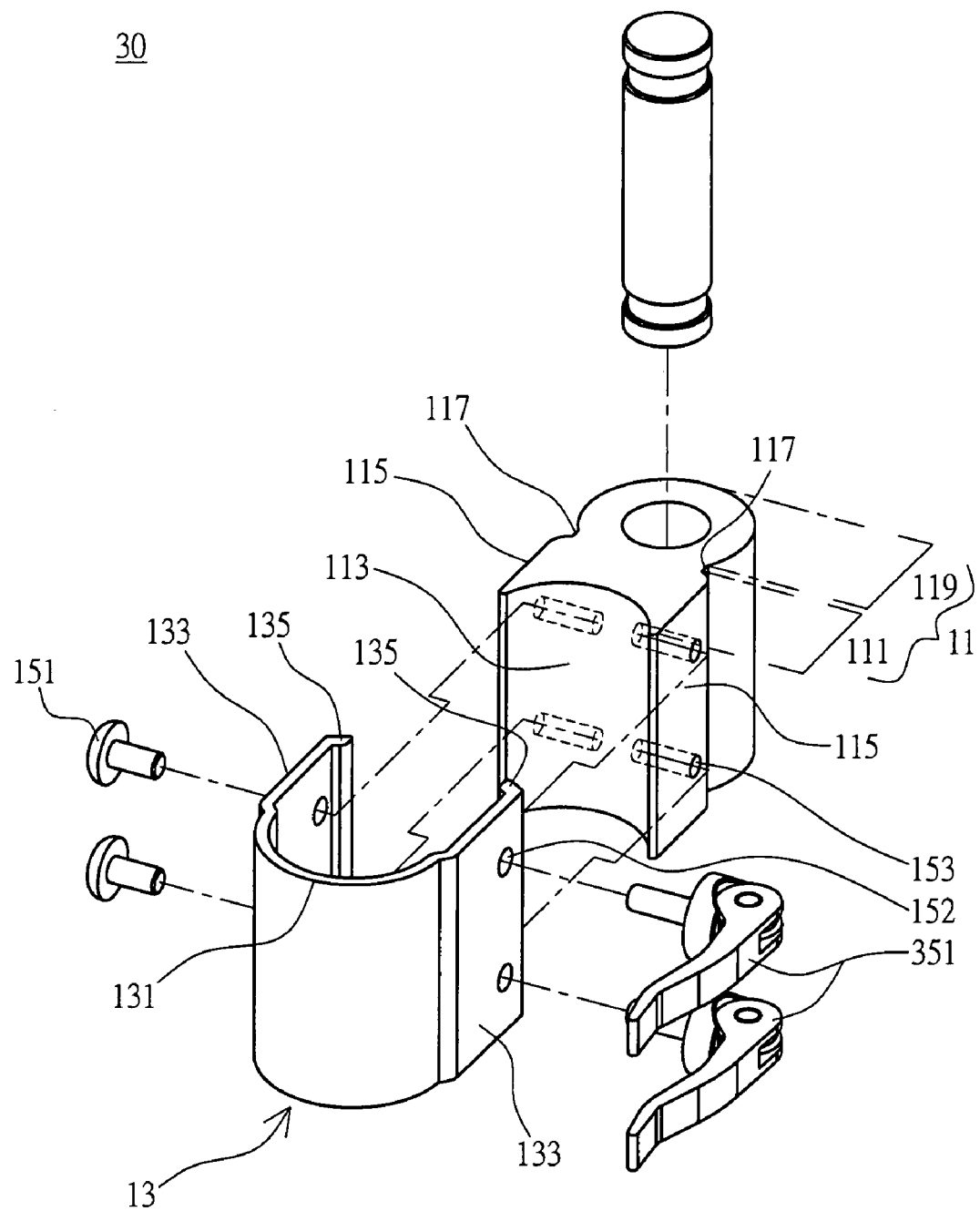
FIG. 3A is an exploded view of a tubular material fixation device according to a second embodiment of the present invention.

FIG. 3A is an exploded view of a second embodiment of the present invention. The tubular material fixation device 30 according to this second embodiment is substantially similar to the aforesaid first embodiment with the exception of the fastening units. This second embodiment uses quick release screw rods 351 to substitute for the aforesaid screws 151. After installation, each quick release screw rod 351 is turned to the locking position to lock the clamping plate 13 to the locating block 11. When unlocking the quick release screw rods 351, the user can adjust the relative position between the tubular material and the tubular material fixation device 30 quickly.

According to this second embodiment, four quick release screw rods 351 may be used to substitute for all the aforesaid screws 151. Alternatively, two quick release screw rods 351 may be used to substitute two screws 151 at one same side, achieving the same effect.

Figure 3B:
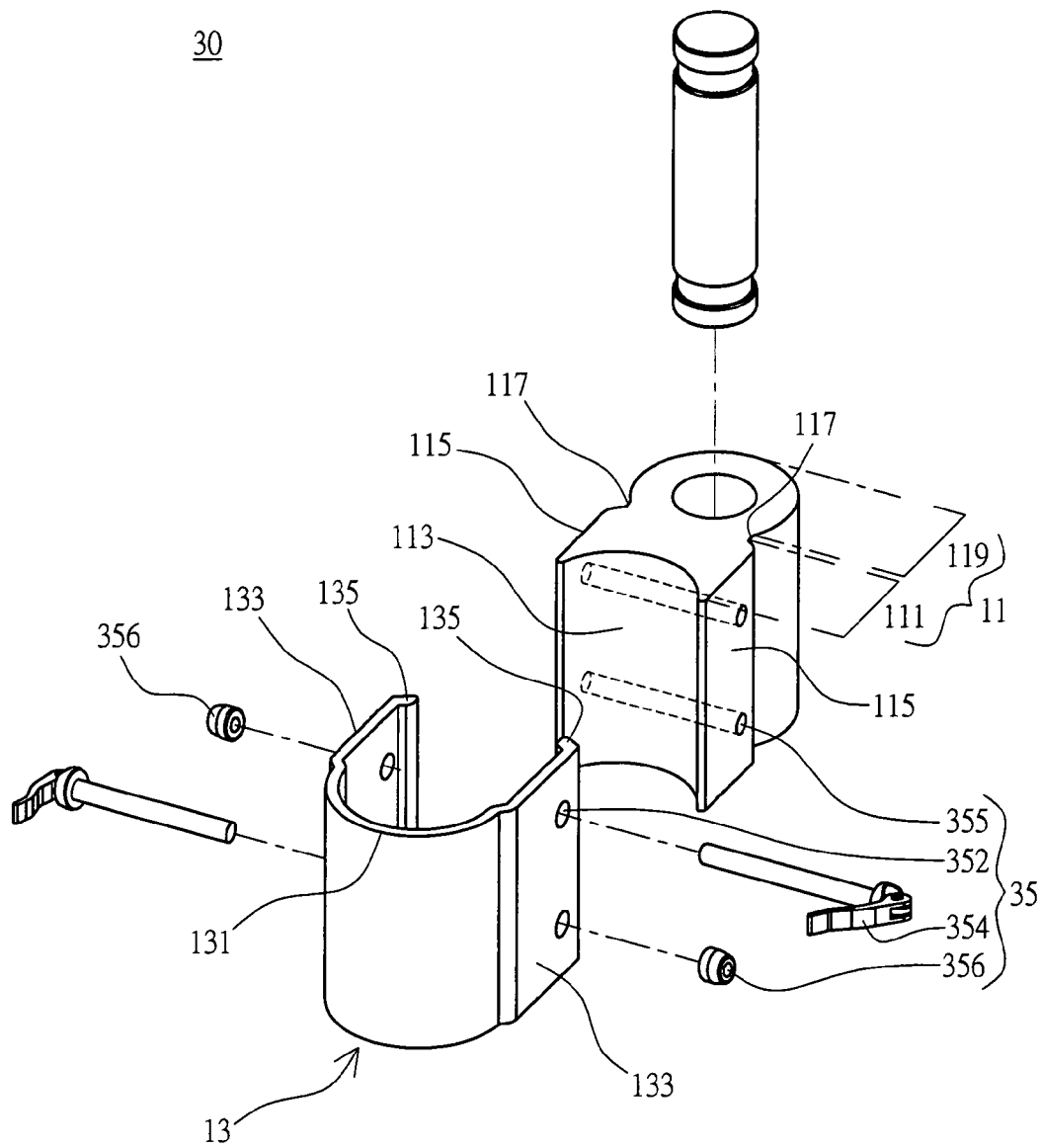
FIG. 3B is an exploded view of a tubular material fixation device according to a third embodiment of the present invention.
Figure 4:
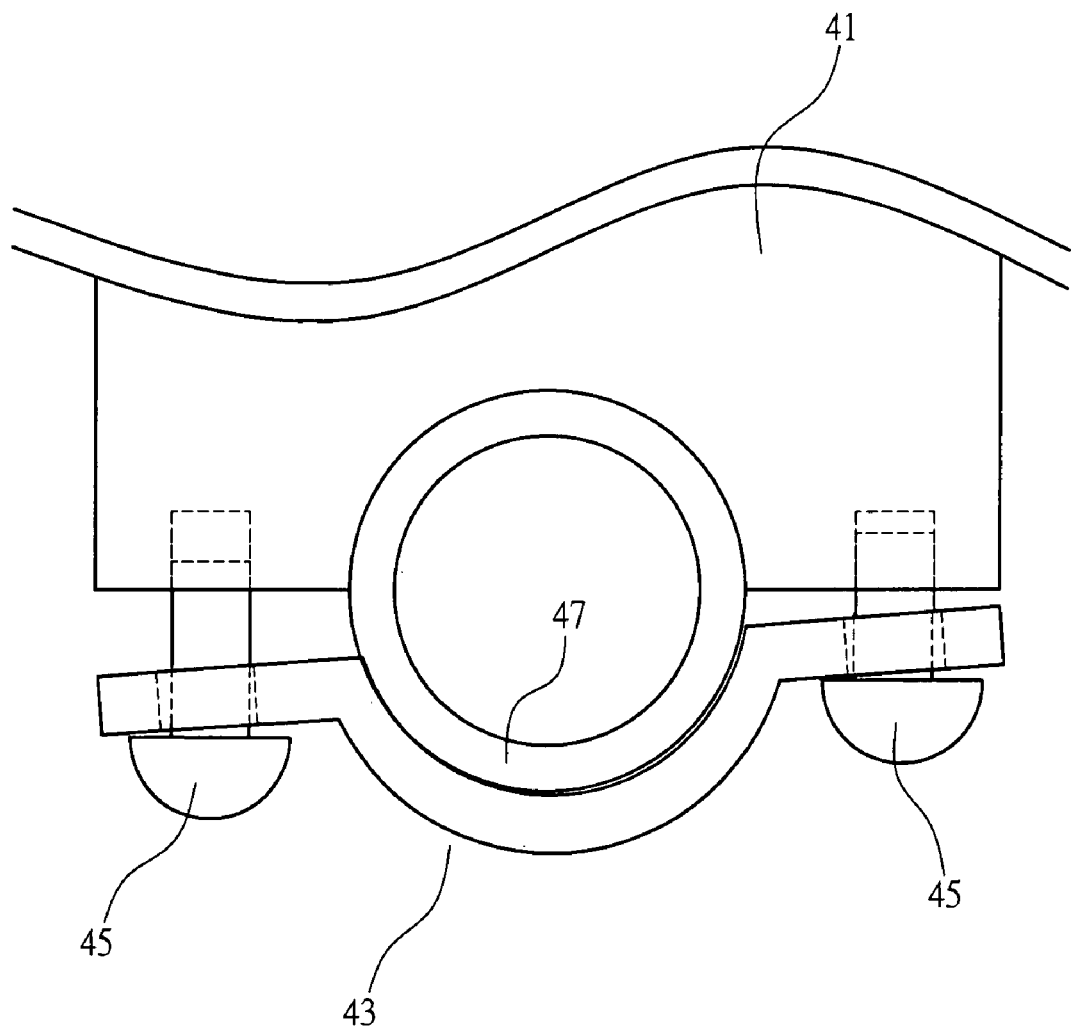
FIG. 4 is a schematic sectional view showing an application example of a tubular material fixation device according to the prior art.

FIG. 3B is an exploded view of a third embodiment of the present invention. According to this embodiment, each fastening unit 35 of the tubular material fixation device 30 comprises a quick release screw rod 354, two through holes 352, an axle hole 355, and a nut 356.

The through holes 352 cut through the side panels 133 respectively. The axle hole 355 extends through the two sidewalls 115 of the clamping portion 111 corresponding to the through holes 352. The quick release screw rod 354 is inserted through the through holes 352 and the axle hole 355 and then screwed up with the nut 356. When installed, the user can operate each quick release screw rod 354 to lock the clamping plate 13 to the locating block 11, affixing the tubular member fixation device 30 to the tubular material (not shown).

It is to be understood that the diameter of the through holes 352 must be greater than the diameter of the quick release screw rods 354 so that the ribs 135 can be moved along the associating guide surface portions 117 to carry the side panels 133 toward the locating block 11.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A tubular material fixation device comprising:
   a locating block, said locating block comprising a clamping groove and two sidewalls at two sides of said clamping groove, said sidewalls each having at least one guide surface portion;
   a clamping plate, said clamping plate having a curved portion corresponding to said clamping groove for securing a tubular material to said clamping groove, two side panels respectively extending from two sides of said curved portion for attaching to said sidewalls of said locating block, and two ribs respectively extending from said side panels corresponding to said guide surface portions of said locating block; and
   at least one fastening unit for fastening said side panels to said sidewalls to affix said locating block and said clamping plate to a tubular material being set in between said clamping groove and said curved portion, wherein said at least one fastening unit each comprises a through hole cut through one side panel of said clamping plate, a screw hole formed on one sidewall of said locating block, and a screw inserted through said through hole and threaded into said screw hole.

2. The tubular material fixation device as claimed in claim 1, wherein said guide surface portions are oblique planes.

3. The tubular material fixation device as claimed in claim 1, wherein said guide surface portions are arched planes.

4. The tubular material fixation device as claimed in claim 1, wherein said locating plate further comprises a bearing portion joined to said clamping portion for supporting an external body.

5. The tubular material fixation device as claimed in claim 1, wherein said screw holes have a diameter greater than the diameter of said screw for necessary moving space.

6. The tubular material fixation device as claimed in claim 1, wherein said clamping groove has a smoothly arched cross section.

7. The tubular material fixation device as claimed in claim 6, wherein said curved portion of said clamping plate has a smoothly arched cross section.

8. A tubular material fixation device comprising:
   a locating block, said locating block comprising a clamping groove and two sidewalls at two sides of said clamping groove, said sidewalls each having at least one guide surface portion;
   a clamping plate, said clamping plate having a curved portion corresponding to said clamping groove for securing a tubular material to said clamping groove, two side panels respectively extending from two sides of said curved portion for attaching to said sidewalls of said locating block, and two ribs respectively extending from said side panels corresponding to said guide surface portions of said locating block; and at least one fastening unit for fastening said side panels to said sidewalls to affix said locating block and said clamping plate to a tubular material being set in between said clamping groove and said curved portion, wherein said at least one fastening unit each comprises two through holes respectively cut through the side panels of said clamping plate, an axle hole cut through the two sidewalls of said locating block, a quick release screw rod inserted through said through holes and said axle hole, and a nut fastened to said quick release screw rod and stopped at one side of one side panel of said clamping plate.

9. The tubular material fixation device as claimed in claim 8, wherein said through holes have a diameter greater than the diameter of said quick release screw rod.

10. A tubular material fixation device comprising:

a locating block, said locating block comprising a clamping groove and two sidewalls at two sides of said clamping groove, said sidewalls each having at least one guide surface portion;

a clamping plate, said clamping plate having a curved portion corresponding to said clamping groove for securing a tubular material to said clamping groove, two side panels respectively extending from two sides of said curved portion for attaching to said sidewalls of said locating block, and two ribs respectively extending from said side panels corresponding to said guide surface portions of said locating block; and at least one fastening unit for fastening said side panels to said sidewalls to affix said locating block and said clamping plate to a tubular material being set in between said clamping groove and said curved portion, wherein said at least one fastening unit each comprises a through hole cut through one side panel of said clamping plate, a screw hole formed on one sidewall of said locating block, and a quick release screw rod inserted through said through hole and threaded into said screw hole.

11. The tubular material fixation device as claimed in claim 10, wherein said screw holes have a diameter greater than the diameter of said quick release screw rod.

* * * * *